United States Patent
Zoppas et al.

(10) Patent No.: US 11,400,630 B2
(45) Date of Patent: Aug. 2, 2022

(54) METHOD FOR INCREASING THE INJECTION SPEED OF A PLASTIC INJECTION DEVICE

(71) Applicant: S.I.P.A. Societa' Industrializzazione Progettazione E Automazione S.P.A., Vittorio Veneto (IT)

(72) Inventors: Matteo Zoppas, Conegliano (IT); Alberto Armellin, Vittorio Veneto (IT); Michele Varaschin, Vittorio Veneto (IT); Giancarlo Besa, Orsago (IT)

(73) Assignee: S.I.P.A. SOCIETA' INDUSTRIALIZZAZIONE PROGETTAZIONE E AUTOMAZIONE S.P.A., Vittorio Veneto (IT)

( * ) Notice: Subject to any disclaimer, the term of this patent is extended or adjusted under 35 U.S.C. 154(b) by 588 days.

(21) Appl. No.: 16/315,399

(22) PCT Filed: Jul. 3, 2017

(86) PCT No.: PCT/IB2017/054002
§ 371 (c)(1),
(2) Date: Jan. 4, 2019

(87) PCT Pub. No.: WO2018/007929
PCT Pub. Date: Jan. 11, 2018

(65) Prior Publication Data
US 2019/0308352 A1 Oct. 10, 2019

(30) Foreign Application Priority Data
Jul. 5, 2016 (IT) .................. 102016000069730

(51) Int. Cl.
*B29C 45/62* (2006.01)
*B29C 45/18* (2006.01)
(Continued)

(52) U.S. Cl.
CPC ........ *B29C 45/531* (2013.01); *B29C 45/1808* (2013.01); *B29C 45/23* (2013.01);
(Continued)

(58) Field of Classification Search
CPC ... B29C 45/531; B29C 45/1808; B29C 45/62; B29C 45/23; B29C 45/53; B29C 45/544; B29K 2067/003; B29L 2031/7158
See application file for complete search history.

(56) References Cited

U.S. PATENT DOCUMENTS 2,616,130 A  11/1952 Banz
3,153,815 A  10/1964 Seidl
(Continued)

FOREIGN PATENT DOCUMENTS

DE  102010023500  12/2011
JP  H04-124613  11/1992
JP  H0985787 A  3/1997

OTHER PUBLICATIONS

English translation of WO 2014/111902 (Year: 2014).*

*Primary Examiner* — Joseph S Del Sole
*Assistant Examiner* — Baileigh Kate Darnell
(74) *Attorney, Agent, or Firm* — Stetina Brunda Garred & Brucker

(57) ABSTRACT

A method for increasing the injection speed of a melted plastic injection device for injecting said melted plastic into a molding cavity (51), said injection device comprising a first cylinder (1) provided with a tubular casing (2) defining a first inner diameter $d_1$, and a first piston (3) slidable inside said tubular casing (2), adapted to be loaded with melted plastic and to inject said melted plastic toward the molding cavity (51); a second cylinder (21) constrained to the first cylinder (1) and provided with a second piston (23) which rod (24) is connected to the first piston (3) and is adapted to actuate said first cylinder (1) during an injection operation;
(Continued)

the method comprising the steps of: —releasing second cylinder (21) and first cylinder (1) by extracting the first piston (3) from the tubular casing (2); —coaxially inserting a tubular body (12), defining a second inner diameter $d_3$ which is smaller than the first inner diameter $d_1$, into the tubular casing (2); —disconnecting the first piston (3) from the rod (24); —connecting a third piston (13) to the rod (24), said third piston (13) being sized to slide inside said tubular body (12); —constraining second cylinder (21) and first cylinder (1) by inserting the third piston (13) into the tubular casing (2).

8 Claims, 4 Drawing Sheets

(51) Int. Cl.
  *B29C 45/53* (2006.01)
  *B29C 45/23* (2006.01)
  *B29K 67/00* (2006.01)
  *B29L 31/00* (2006.01)
  *B29C 45/54* (2006.01)

(52) U.S. Cl.
  CPC .............. *B29C 45/53* (2013.01); *B29C 45/62* (2013.01); *B29C 45/544* (2013.01); *B29K 2067/003* (2013.01); *B29L 2031/7158* (2013.01)

(56) References Cited

U.S. PATENT DOCUMENTS

| | | | |
|---|---|---|---|
| 2008/0124424 A1* | 5/2008 | Mie | B29C 49/58 425/535 |
| 2012/0276235 A1 | 11/2012 | Belzile et al. | |
| 2015/0273746 A1 | 10/2015 | Koch et al. | |

* cited by examiner

METHOD FOR INCREASING THE INJECTION SPEED OF A PLASTIC INJECTION DEVICE

CROSS REFERENCE TO RELATED APPLICATION(S)

The present application claims priority to PCT International Application No. PCT/IB2017/054002 filed on Jul. 3, 2017, which application claims priority to Italian Patent Application Nos. 102016000069730 filed Jul. 5, 2016, 2016, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to a method for modifying an injection device for injecting melted plastic into at least one cavity of a mold.

BACKGROUND ART

Machines for producing plastic objects, e.g. bottle preforms, typically comprise an apparatus for injecting melted plastic.

A cylinder-piston system cooperating with a respective injector, or injection cylinder, of the melted plastic is provided for each preform to be produced. The injector is connected to a chamber provided with an injection channel which leads into a respective molding cavity. The rod of the piston of the cylinder-piston system is partly inserted into the injection cylinder. A further piston is constrained at one end of the rod, which piston may slide inside the injector under the bias of the cylinder-piston system. The melted plastic comes out of the injector at a given output pressure, which determines the injection speed. Mass production needs require increasingly greater production amounts. Therefore, to obtain increased productivity, there is a need to design new machines capable of having a higher output pressure of the melted plastic. However, since very complex machines are involved which comprise a large amount of cylinder-piston systems and respective injectors for simultaneously producing the greatest number of preforms possible, the construction of new machines requires large investments of money and labor. It would therefore be desirable to have an injection device, and therefore a machine comprising various injection devices, with increased productivity which may be obtained with fewer efforts than those of the prior art.

SUMMARY OF THE INVENTION

It is an object of the present invention to provide a method for increasing the injection speed of a device for injecting melted plastic.

It is another object of the invention to provide a method for increasing the injection speed of a device for injecting melted plastic in a simple and affordable manner.

In particular, it is one object of the invention to provide a method for retrofitting a device for injecting melted plastic in order to increase the injection speed thereof.

The present invention achieves these and other objects which shall become apparent in light of the present description by providing a method for increasing the injection speed of a device for injecting melted plastic in order to inject said melted plastic into a molding cavity, said injection device comprising: a first cylinder provided with a tubular casing defining a first inner diameter $d_1$, and with a first piston slidable inside said tubular casing and adapted to be loaded with melted plastic and to inject said melted plastic toward the molding cavity; a second cylinder constrained to the first cylinder and provided with a second piston the rod of which is connected to the first piston and is adapted to actuate said first cylinder during an injection operation, the method comprising the steps of:

releasing the second cylinder and the first cylinder by extracting the first piston from the tubular casing;

coaxially inserting a tubular body, defining a second inner diameter $d_3$ which is smaller than the first inner diameter $d_1$, into the tubular casing;

disconnecting the first piston from the rod;

connecting a third piston to the rod, said third piston being sized to slide inside said tubular body;

constraining the second cylinder and the first cylinder by inserting the third piston into the tubular casing.

A device for injecting melted plastic may be obtained by means of the method of the invention, the device comprising:

a first cylinder adapted to inject the melted plastic into a molding cavity; a second cylinder adapted to actuate said first cylinder; wherein the first cylinder comprises: a tubular casing having an inner diameter $d_1$ and a tubular body having a smaller inner diameter $d_3$ than the inner diameter $d_1$ of the tubular casing, which tubular body is coaxially inserted into the tubular casing, and wherein there is provided a piston inserted in the tubular body and constrained to the second cylinder, said piston being adapted to slide inside the tubular body by actuating the second cylinder to push the melted plastic during an injection operation.

Optionally, the second cylinder has an inner diameter $d_2$ which defines an inner area A2, the inner diameter $d_3$ of the tubular body defines an inner area A3, and the ratio A2/A3 is comprised between 6 and 25, preferably between 8 and 20, more preferably between 10 and 18.

Optionally, the inner diameter $d_3$ of the tubular body is between 18 and 30 mm.

Optionally, the tubular body is provided with an annular radial projection abutting with an outer end surface of the tubular casing, the outer end surface being distal from the second cylinder.

Optionally, the second cylinder is a pneumatic cylinder.

Optionally, the tubular body is fixed to the tubular casing so as to always remain fixed in position when the piston slides therein.

Optionally, the tubular body has a greater axial length than the axial length of the tubular casing.

According to one aspect, a kit for executing such a method is provided, the kit comprising: a tubular body defining an inner diameter $d_3$ and a third piston sized to slide inside said tubular body.

Typically, a machine for producing preforms comprises a plurality of devices for injecting melted plastic. Each injection device is provided with an injector which cooperates with a respective cylinder-piston system. The cylinder-piston system preferably is of the pneumatic type, e.g. a pneumatic cylinder, or is of the hydraulic oil type.

Due to the invention, injectors of an existing machine can be modified in a simple and quick manner. A modified injector can be obtained with such a modification, which injector has a greater output pressure and therefore provides the machinery on which it is assembled with a greater productivity.

Since manufacturers already have very costly and complex machines available for producing preforms, a great advantage provided by the invention is the ability to avoid needing to design or purchase a new machine or to be required to make drastic modifications to existing machines in order to obtain increased output pressures of the melted plastic.

In particular, due to the invention, it is not required to modify or replace the pneumatic cylinder. For example, it is not required to have a pneumatic cylinder with a larger diameter. This is a great advantage because the modification of such a component would be laborious, costly and would involve a drastic redesign of the machine.

Advantageously, a reduction in the inner diameter of the injector in which the respective piston slides results in an increase in the ratio between the inner areas of the pneumatic cylinder and the injector, and therefore an increased output pressure of the melted plastic, the boring of the pneumatic cylinder being equal.

Indeed, the output pressure is substantially determined by the inner diameter, or boring, of the pneumatic cylinder and by the inner diameter of the injector. Such inner diameters define respective inner areas. The ratio between the inner area defined by the inner diameter of the pneumatic cylinder and the inner area defined by the inner diameter of the injector defines a multiplication factor of the force acting on the melted plastic, and therefore is a parameter affecting the output pressure, and in final analysis, the injection speed.

According to one aspect, the invention also considers the fact that the reduction of the inner diameter of the injector is to be conveniently studied and calibrated on the basis of the amount of melted plastic required for producing each preform.

Indeed, by reducing the inner diameter without increasing the height of the injector, there necessarily is a reduction of volume of melted plastic which can be accommodated by the injection cylinder. Too small an amount of melted plastic cannot be used to obtain a given preform, and therefore the inner diameter of the modified injector—or in other terms, the inner diameter of the cylindrical body—is to be accurately selected.

Moreover, due to the invention, should it be required to have an injector with a greater volumetric capacity, it is sufficient to remove the tubular body from the tubular casing. Therefore, the injection device advantageously is modular, it being versatile according to the production needs.

The dependent claims describe preferred embodiments of the invention.

BRIEF DESCRIPTION OF THE DRAWINGS

Further features and advantages of the invention will be more apparent in light of the detailed description of preferred, but not exclusive, embodiments of an injection device. The description is provided by way of a non-limiting example, with reference to the accompanying drawings, also provided by way of a non-limiting example, in which.

The same reference numerals in the drawings identify the same or equivalent elements and components.

DETAILED DESCRIPTION OF A PREFERRED EMBODIMENT OF THE INVENTION

Figure 1:
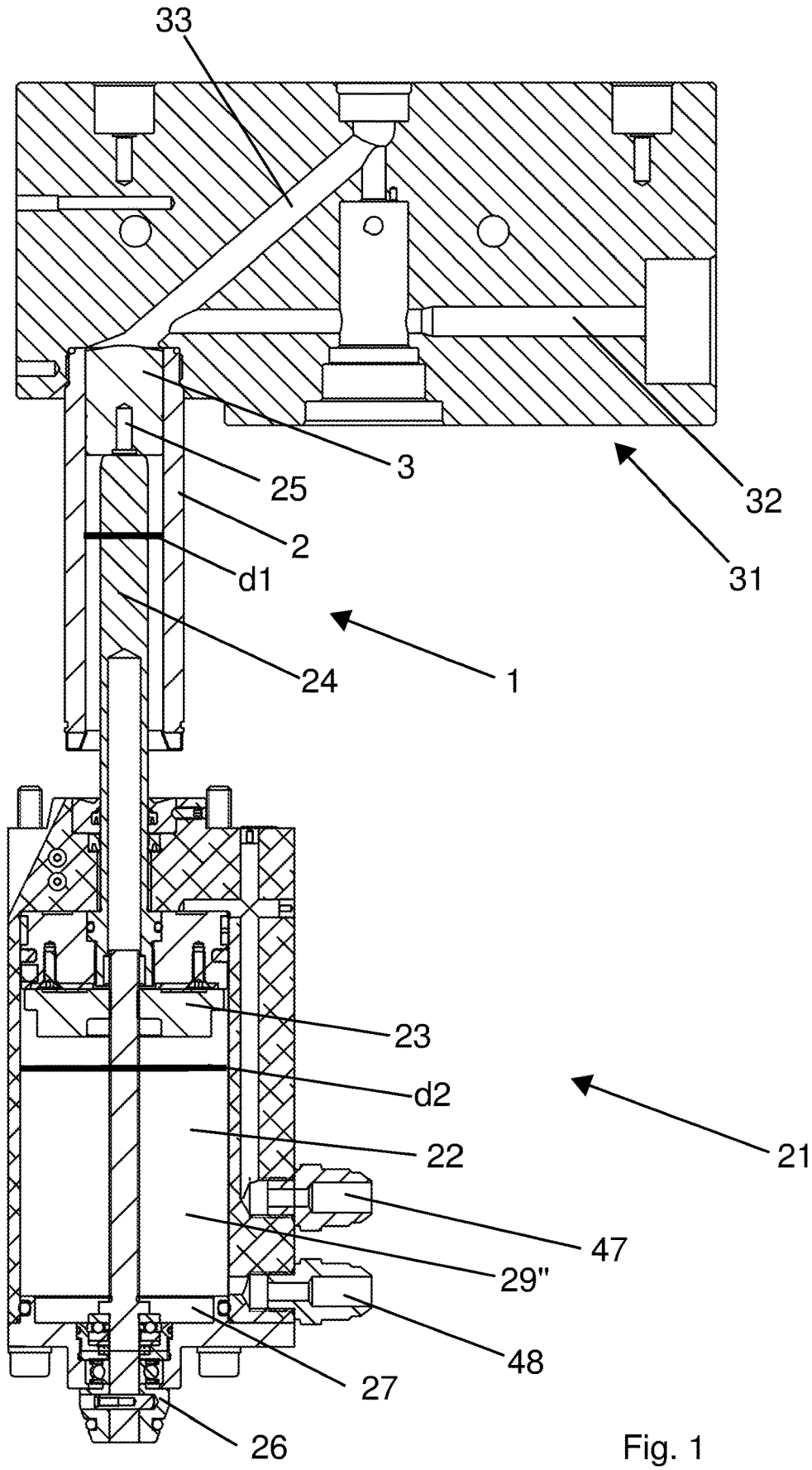
FIG. 1 shows a section of a part of an injection device of the prior art.

FIG. 1 shows an injection device provided with an injector 1, with a pneumatic cylinder 21 and with a chamber, also known as a hot chamber 31. Injector 1 can be modified by means of the method of the present invention.

Figure 2:
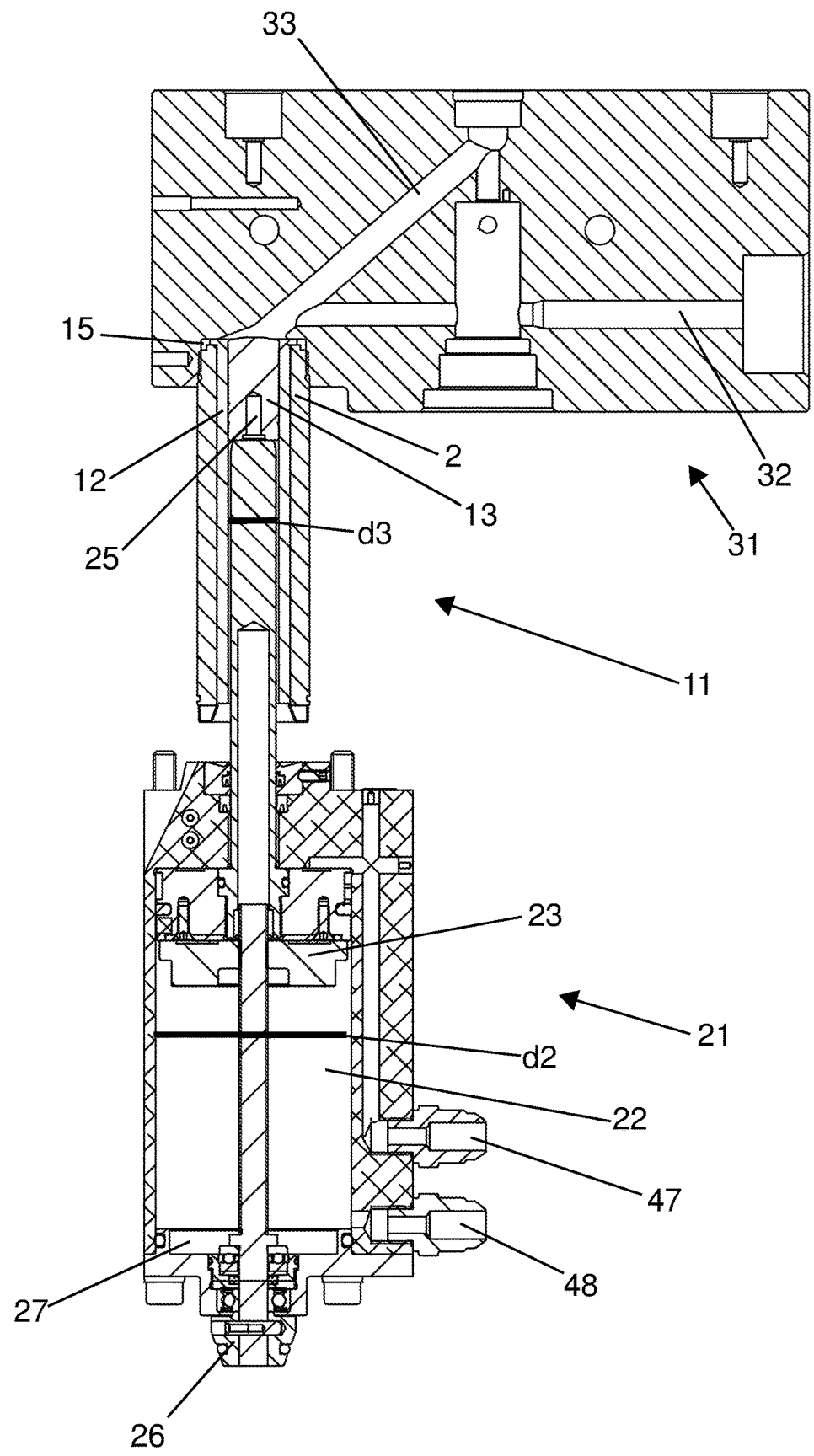
FIG. 2 shows a section of a part of the injection device according to the invention.

FIG. 2 shows the injection device of the invention, which has a modified injector 11 with respect to injector 1 in FIG. 1. For the sole purpose of better understanding the invention, other components with which the injection device may be provided have been omitted from FIGS. 1 and 2.

The injector is also known as a dosing injector or cylinder, and serves to inject melted plastic for the production of plastic objects, for example for the production of bottle preforms (not shown) made of thermoplastic material such as PET.

Injector 1 comprises a hollow tubular casing 2, which substantially is a hollow cylindrical body, which has an inner diameter $d_1$. The inner diameter $d_1$ defines an inner area $A1 = \pi (d_1/2)^2$. Such an inner area A1 is the area of a cross section of the tubular casing 2 along a plane perpendicular to the longitudinal axis of injector 1. Inside the tubular casing 2, a piston 3 is provided, also referred to as a shuttle, which substantially is a cylindrical body.

The outer diameter of piston 3 is slightly smaller than the inner diameter $d_1$ of the tubular casing 2. Piston 3 may slide inside the tubular casing 2 to inject the melted plastic or resin.

An upper portion of injector 1 is constrained to the hot chamber 31. The hot chamber 31 comprises a duct 32 which communicates with the tank of the injector 1. The melted plastic from an extruder (not shown) passes through duct 32. The tank of injector 1 is filled, by means of duct 32, with the melted plastic by lowering piston 3. The hot chamber 31 is also provided with another duct 33 which communicates with tank 1, which allows the molding cavity to be filled with the melted plastic pushed by piston 3.

The movement of piston 3 is obtained by means of a pneumatic cylinder 21, which is a cylinder-piston system. The pneumatic cylinder 21 comprises a cylinder 22 and a double-acting piston 23 which is provided with a rod 24. A pin 25 is preferably provided at an end of rod 24. Pin 25 is inserted in a respective seat of piston 3. Piston 3 moves inside the tubular casing 2 under the bias of the pneumatic cylinder 21.

Cylinder 22 of the pneumatic cylinder 21 has an inner diameter $d_2$. The inner diameter $d_2$ defines an inner area $A2 = \pi (d_2/2)^2$. Such an inner area A2 is the area of a cross section of cylinder 22 along a plane perpendicular to the longitudinal axis of the pneumatic cylinder 21.

The ratio between the inner area A2 of cylinder 22 and the inner area A1 of the tubular casing 2 is defined $R1 = (A2/A1)$.

The value R1 is a multiplication factor for calculating the pressure exerted by piston 3 on the melted plastic. The higher the value of the multiplication factor, the greater the pressure exerted on the melted plastic.

According to the invention, it is possible to intervene by increasing the value of the multiplication factor. Advantageously, to increase such a factor, it is sufficient to modify injector 1 without the need to modify the pneumatic cylinder 21.

To this end, a kit is provided which comprises a hollow tubular body 12 and a piston 13, also referred to as a shuttle (FIG. 2). The tubular body 12, which substantially is a cylindrical body, has a smaller inner diameter $d_3$ than the inner diameter $d_1$ of the tubular casing 2. The inner diameter $d_3$ defines an inner area $A3=\pi (d_3/2)^2$. Such an inner area $A3$ is the area of a cross section of the tubular body 12 along a plane perpendicular to the longitudinal axis of injector 11.

The outer diameter of the tubular body 12 is slightly smaller than the inner diameter $d_1$ of the tubular casing 2. In this embodiment, the tubular body 12 is provided with an annular radial projection 15 at an end thereof. When the tubular body 12 is inserted into the tubular casing 2, the projection 15 abuts with an upper surface of the tubular casing 2 so that the tubular body 12 and the tubular casing 2 are constrained to each other. Typically, projection 15 is interlocked between the hot chamber 31 and the tubular casing 2. Alternatively, it may be sufficient for the tubular body 12 to abut with a lower surface of the tubular casing 2, the radial projection 15 being not required.

Piston 13 substantially is a cylindrical body. The outer diameter of piston 13 is slightly smaller than the inner diameter $d_3$ of the tubular body 12. It is apparent that the outer diameter of piston 13 in FIG. 2 is smaller than the outer diameter of piston 3 in FIG. 1. Piston 13 can slide inside the tubular body 12 to inject the melted plastic into the tank 16 of injector 11. Piston 13 can be made by means of processing by removing the chipping of piston 3, or it may be made ex novo.

Due to the tubular body 12, injector 11 has a smaller inner diameter $d_3$ than the inner diameter $d_1$ of injector 1, which instead does not have the tubular body 12. In particular, as mentioned above, the inner diameter $d_3$ of the tubular body 12 is smaller than the inner diameter $d_1$ of the tubular casing 2.

Thus, the ratio between the inner area $A2$ of cylinder 22 and the inner area $A3$ of the tubular body 12 is defined $R2=(A2/A3)$. Since $A3$ is less than $A1$, $R2$ is greater than $R1$.

Accordingly, with injector 11 provided with the tubular body 12, a greater multiplication factor is obtained with respect to injector 1.

By mere way of example, if $d_3=18$ mm and $d_2=70$ mm, ratio $R2=15.12$.

Preferably, the tubular casing 2 remains the same both before and after the modification. Therefore, since the height thereof has not changed, injector 11 has a tank 16 with a smaller volume available for the melted plastic with respect to the volume of injector 1. The invention takes into consideration the fact that in order to obtain a given preform, an amount of melted plastic is required which should not fall below a given threshold.

For this reason, it is preferable for the ratio between the inner area $A2$ of cylinder 22 and the inner area $A3$ of injector 11, i.e. of the inner area $A3$ of the tubular body 12, to be between 6 and 25 or between 8 and 20 or between 10 and 18.

Preferably, the inner diameter $d_3$ of the tubular body 12 is between 18 and 30 mm, even more preferably between 20 mm and 26 mm.

The aforesaid size of the inner diameter $d_3$ is a construction feature which may be taken into consideration individually or combined with the aforesaid range of values for ratio $R2$ between the areas.

It is apparent that when injector 1 is provided with the tubular body 12, the melted plastic from the extruder fills tank 16 substantially defined by the inner wall of the tubular body 12 and by the upper face of piston 13.

An exemplary method for obtaining an injection device of the invention includes:
  releasing the pneumatic cylinder 21 and the injector 1 by extracting piston 3 from the tubular casing 2;
  coaxially inserting the tubular body 12, defining the second inner diameter $d_3$ which is smaller than the first inner diameter $d_1$, into the tubular casing 2;
  disconnecting piston 3 from rod 24;
  connecting piston 13 to rod 24, piston 13 being sized to slide inside the tubular body 12;
  constraining the pneumatic cylinder 21 and injector 1 to each other by inserting piston 13 into the tubular casing 2.

Typically, piston 13 is different from piston 3, as described above.

The invention also relates to a machine (not shown) such as for example, a rotary carousel, for the production of plastic objects, in particular bottle preforms, comprising a plurality of injection devices.

Figure 3:
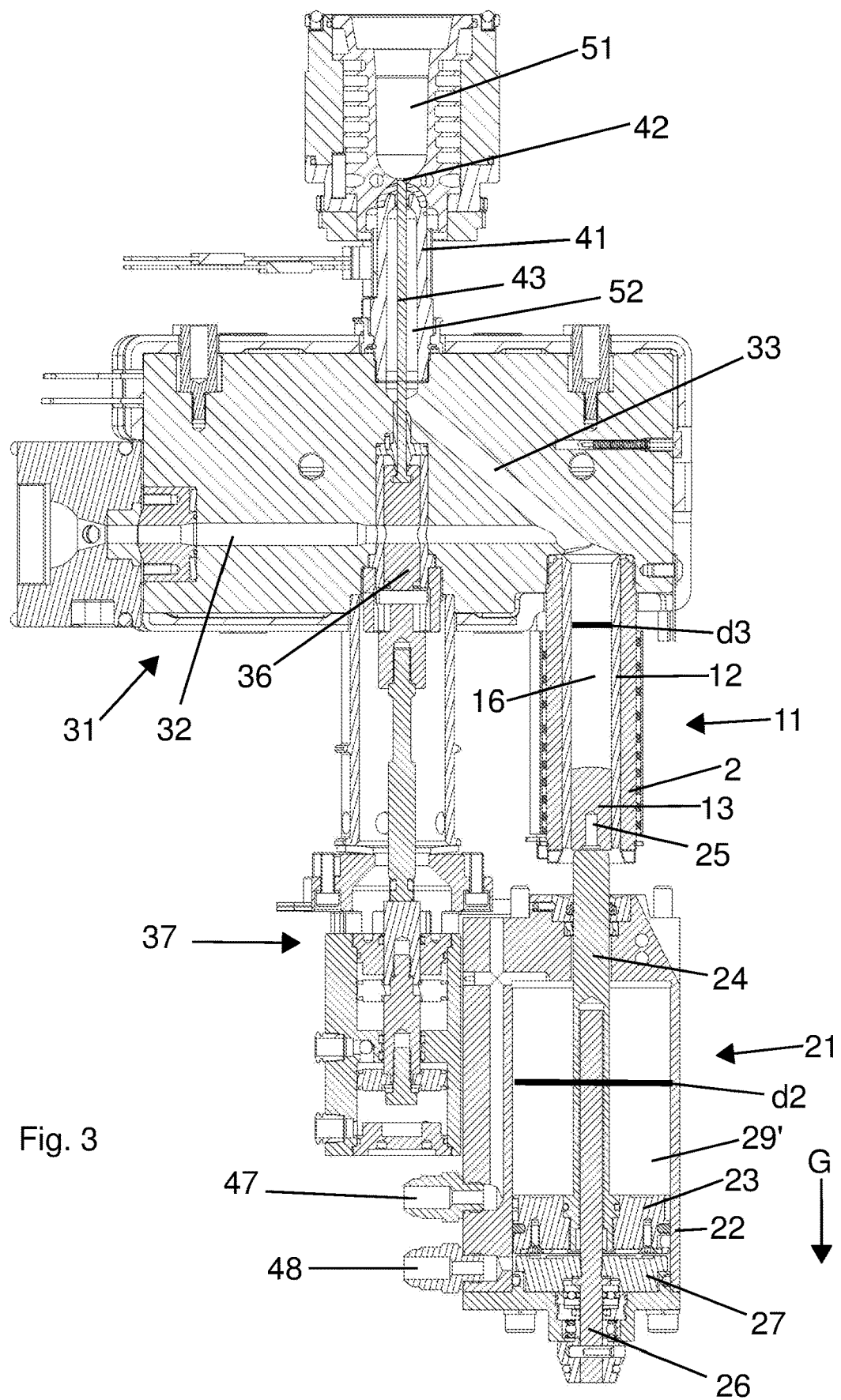
FIG. 3 shows a section of a part of an injection device of the invention in an operating configuration.
Figure 4:
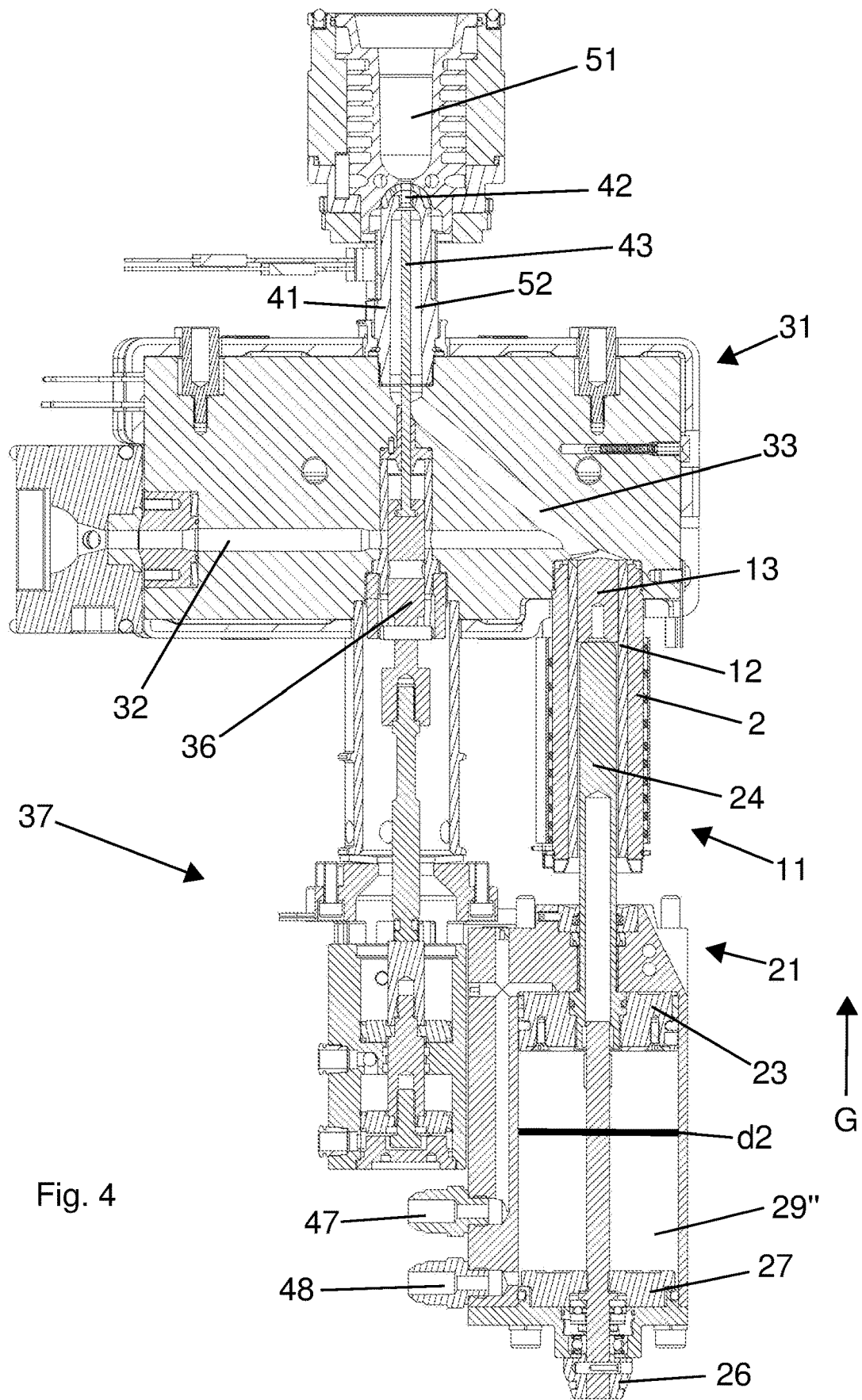
FIG. 4 shows a section of the device in FIG. 3 in another operating configuration.

The injection device is described in greater detail with reference to FIGS. 3 and 4, which depict the end of the step of loading the dose of resin (or melted plastic) and the end of the step of filling (or injection) the molding cavity 51 with the dose of resin for each molding cycle, respectively. The resin is injected into the molding cavity 51 by means of the push of piston 13 sliding inside the dosing injector 11 connected with the hot chamber 31. Piston 13 is actuated by means of the pneumatic cylinder 21, which in turn is controlled by a valve (not shown in the drawings). Where needed, suitable heating means for the different parts of the injection device are provided, e.g. resistive band heating means for maintaining the resin at the design temperature.

An injection nozzle 41 is arranged at the top of the hot chamber 31 and it is also heated with an electrical resistance, e.g. a band electrical resistance. Such an injection nozzle 41 allows the dose of melted material to pass into the molding cavity 51 through hole 42. Preferably, hole 42 has a diameter of 3 to 5 mm, e.g. 4 mm.

The heat chamber 31 is crossed by duct 32 which is connected to a manifold receiving the resin from an extruder (not shown). Duct 32 communicates with duct 33, which is inside the heat chamber 31 and connects tank 16 of the dosing injector 11 with the injection duct 52 of the injection nozzle 41. During the operations, hole 42 is opened or closed by means of a shutter 43.

The mechanism actuating the communication between the step of filling injector 11 and the step of filling the molding cavity 51 may be a valve 36, e.g. a shuttle or gate valve, capable of opening or closing the passage of the melted resin from duct 32 toward tank 16 for filling the dosing injector 11. Valve 36 is actuated by means of an actuation device 37 arranged at a first end of valve 36. Shutter 43 is integrally connected to a second end of valve 36, opposite to the first end. The actuation device 37, valve 36 and shutter 43 are arranged longitudinally and preferably along a same axis.

The actuation device 37 comprises two separate cylindrical chambers provided with respective mutually integral pistons. The lower cylindrical chamber is provided with two input/output ducts of the compressed air.

A screw setting head 26 for adjusting the position of the abutment plate 27 of the double-acting piston 23 for accurately adjusting the basis weight of the dose of melted resin, also to the hundredth of a gram, is provided at the bottom of cylinder 22, or cylindrical chamber, of the pneumatic cylinder 21 of the dosing injector 11. The position of the abutment plate 27 may be set individually for a better sizing of the preforms.

The double-acting piston 23 of the pneumatic cylinder 21 is actuated by a combination of pressures and counterpressures generated by the compressed air introduced into the two upper 29' and lower 29" chambers and by the melted resin from the extruder by means of duct 32 of the hot chamber 31.

In the step of loading the resin into the dosing injector 11, corresponding to a lowering of piston 23 along the direction indicated by arrow G (FIG. 3), the pressure of the melted resin pushed by the extruder into tank 16 acts on piston 13 and prevails with respect to the combination of the pressures of the compressed air introduced into the upper chamber 29', which is conveniently adjusted between 10 to 40 bar, and into the lower chamber 29", again connected to the air circuit preferably at 40 bar.

In the step of injecting the melted resin, corresponding to raising piston 23 along the direction indicated by G (FIG. 4), the high pressure compressed air, preferably at 40 bar, from the input fitting 48 acts in the lower chamber 29", while the upper chamber 29' of the pneumatic cylinder 21 itself is connected by means of a valve for controlling the recovery circuit of the low pressure air (0 to 8 bar) by means of the output fitting 47.

The coordinated movement of valve 36, shutter 43 and dosing injector 11, and also the calibration of the abutment plate 27, allows to accurately dose the required amount of melted resin to be introduced into the molding cavity 51 depending on the design of the preform to be produced. The coordinated movement of the injection device is actuated using electro-valves controlled by programmable systems.

In particular, valve 36 is opened by means of the actuation device 37, thus leaving open duct 32, when piston 13 of the dosing injector 11 is in the forward or top position (configuration not shown). The opening of valve 36 by means of an upward movement thereof causes the closing of hole 42 of the injection nozzle 41 by means of shutter 43 and a retraction of the double-acting piston 23 of the dosing injector 11 under the bias of the front of pressurized melted resin from the hot chamber 31 and which fills tank 16, as depicted in FIG. 3.

Once the double-acting piston 23 has reached the abutment plate 27 (FIG. 3), the loading step is completed and the dosing injector 11 is ready to inject the dose into the molding cavity 51 as soon as the respective control is given.

The injection step includes closing valve 36 by means of a downward movement thereof caused by the actuation device 37 and the simultaneous opening of shutter 43, which is lowered thus freeing the output section of nozzle 41 (FIG. 4), i.e. hole 42, and the successive injection movement of the dosing injector 11 by means of the double-action piston 23. Since valve 36 is closed during the forward travel of piston 13 of the dosing injector 11, the melted resin is forced to pass through duct 33 to arrive inside the molding cavity 51.

The invention claimed is:

1. A method for increasing the injection speed of a melted plastic injection device for injecting said melted plastic into a molding cavity, said injection device comprising a first cylinder provided with a tubular casing defining a first inner diameter $d_1$, and with a first piston slidable inside said tubular casing, adapted to be loaded with melted plastic and to inject said melted plastic toward the molding cavity;

a second cylinder constrained to the first cylinder and provided with a second piston the rod of which is connected to the first piston and adapted to actuate said first cylinder during an injection operation;

the method comprising the steps of:

releasing the second cylinder and the first cylinder by extracting the first piston from the tubular casing;

coaxially inserting a tubular body, defining a second inner diameter $d_3$ which is smaller than the first inner diameter $d_1$, into the tubular casing;

disconnecting the first piston from the rod;

connecting a third piston to the rod, said third piston being sized to slide inside said tubular body;

constraining the second cylinder and the first cylinder by inserting the third piston into the tubular casing.

2. An injection device for injecting melted plastic obtainable by means of the method of claim 1, the injection device comprising:

a first cylinder adapted to inject the melted plastic into a molding cavity;

a second cylinder adapted to actuate said first cylinder;

wherein the first cylinder comprises:

a tubular casing having an inner diameter $d_1$ and a tubular body having a smaller inner diameter $d_3$ than the inner diameter $d_1$ of the tubular casing, coaxially inserted into the tubular casing;

wherein there is provided a piston inserted in the tubular body and constrained to the second cylinder, said piston being adapted to slide inside the tubular body by actuating the second cylinder to push the melted plastic during an injection operation;

and wherein the second cylinder has an inner diameter $d_2$ which defines an inner area A2, the inner diameter $d_3$ of the tubular body defines an inner area A3, and the ratio A2/A3 is comprised between 6 and 25.

3. The injection device according to claim 2, wherein the ratio A2/A3 is comprised between 8 and 20, or between 10 and 18.

4. The injection device according to claim 2, wherein the inner diameter $d_3$ of the tubular body is between 18 and 30 mm.

5. The injection device according to claim 2, wherein the tubular body is provided with an annular radial projection abutting with an outer end surface of the tubular casing, the outer end surface being distal from the second cylinder.

6. The injection device according to claim 2, wherein the second cylinder is a pneumatic cylinder.

7. The injection device according to claim 2, wherein the tubular body is fixed to the tubular casing so as to always remain fixed in position when the piston slides therein.

8. The injection device according to claim 2, wherein the tubular body has a greater axial length than the axial length of the tubular casing.

* * * * *